Nov. 1, 1955 W. M. APPLEGATE 2,722,250
JIG FOR SQUARING THE END OF A BOLE
Filed Oct. 22, 1951 2 Sheets-Sheet 1

INVENTOR.
WALTER M. APPLEGATE
BY
Milburn & Milburn
ATTORNEYS

Nov. 1, 1955 W. M. APPLEGATE 2,722,250
JIG FOR SQUARING THE END OF A BOLE
Filed Oct. 22, 1951 2 Sheets-Sheet 2
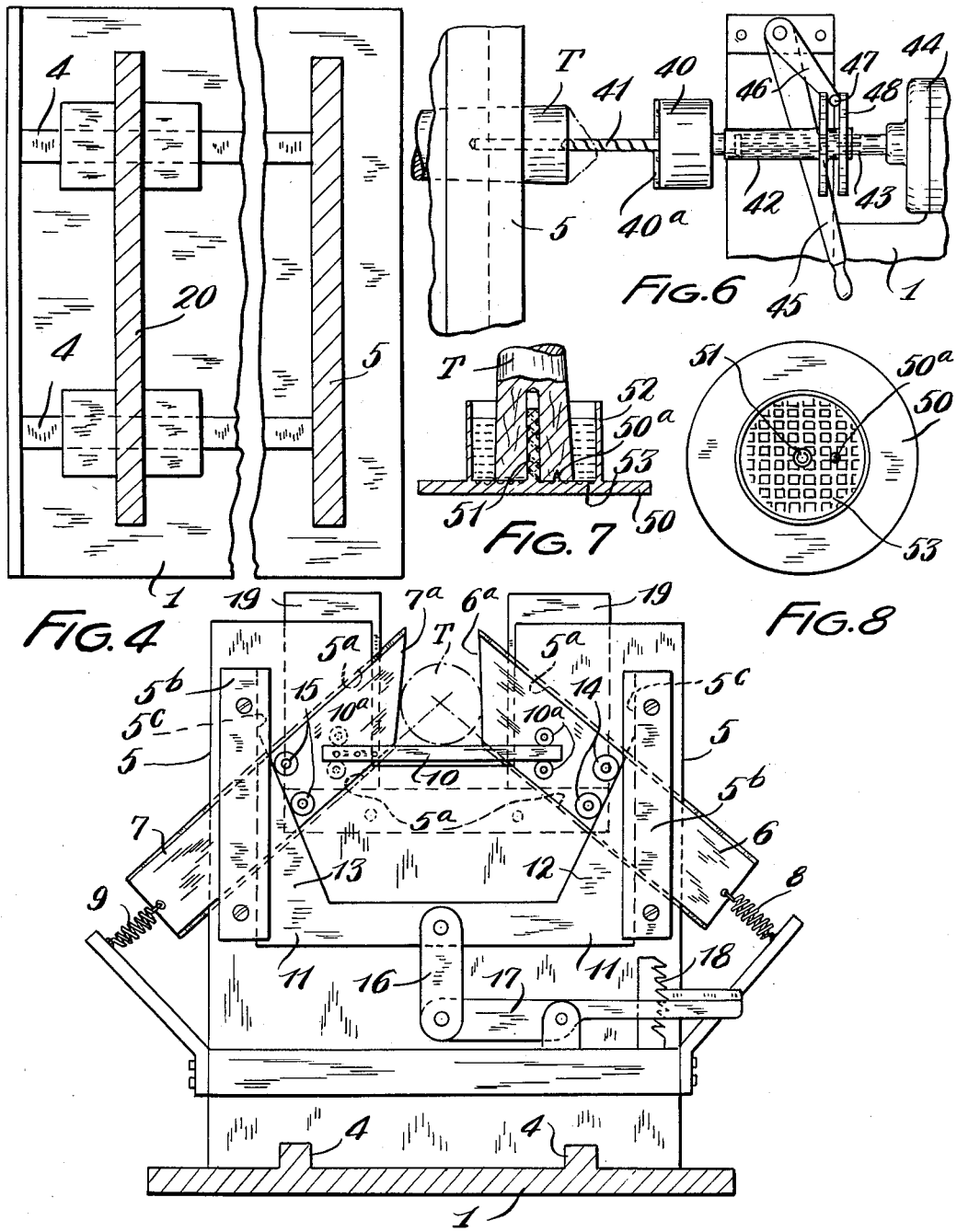
INVENTOR.
WALTER M. APPLEGATE
BY
Milburn Milburn
ATTORNEYS

United States Patent Office 2,722,250
Patented Nov. 1, 1955

2,722,250

JIG FOR SQUARING THE END OF A BOLE

Walter M. Applegate, Sharon, Pa.

Application October 22, 1951, Serial No. 252,485

4 Claims. (Cl. 144—288)

The present invention relates to an improved form of jig for positioning and holding the bole of a tree that has been cut and for forming the larger end thereof so as to be square, that is at right angle, with respect to the longitudinal axis of the bole.

In the past there has been experienced considerable difficulty, particularly with Christmas trees, in supporting them in upright position after having been cut. It is of course well understood that after a tree, as for instance a Christmas tree, has been cut for sale and use, the larger end of the tree trunk is of irregular form and can not be supported in upright position without some form of base for the same. As is well known, there are various devices for receiving and holding the base portion of such a tree but, so far as I am aware, they are all rather complicated or inconvenient to operate or otherwise not satisfactory.

It is therefore the object of my present invention to devise a jig within which a tree or other body of tapering form may be placed and held in proper position for forming its larger end with a squared surface at right angle to the longitudinal axis thereof so as to thereby simplify the means of support to be provided therefor.

A further object is to devise a combined jig for properly positioning and holding a tapering form of body with respect to its longitudinal axis, and means for forming upon the larger end thereof a surface that is normal to the longitudinal axis of the body.

Another object is to provide such a combined device with means for forming a hole in the larger end of the tapering body co-axially thereof, and at the same time forming its larger end with a surface that is normal to the longitudinal axis of the body.

Another object is to devise a simple supporting means for the tree or other such tapering body after its lower end has been properly formed in accordance with the present invention.

Other objects will appear from the following description and claims when considered together with the accompanying drawing.

Fig. 3 is a view taken on line 3—3 of Fig. 1;

Fig. 4 is a contracted view taken on line 4—4 of Fig. 1;

Fig. 6 illustrates another form of means for forming the squared end of the tree trunk, this means including also a means for forming a bore in the end of the tree trunk;

Fig. 7 is a partial sectional view illustrating a tree with its lower end squared and with a bore formed in its lower end positioned within a simple form of supporting means therefor; and Fig. 8 is a top plan view of such supporting means.

Figure 1:
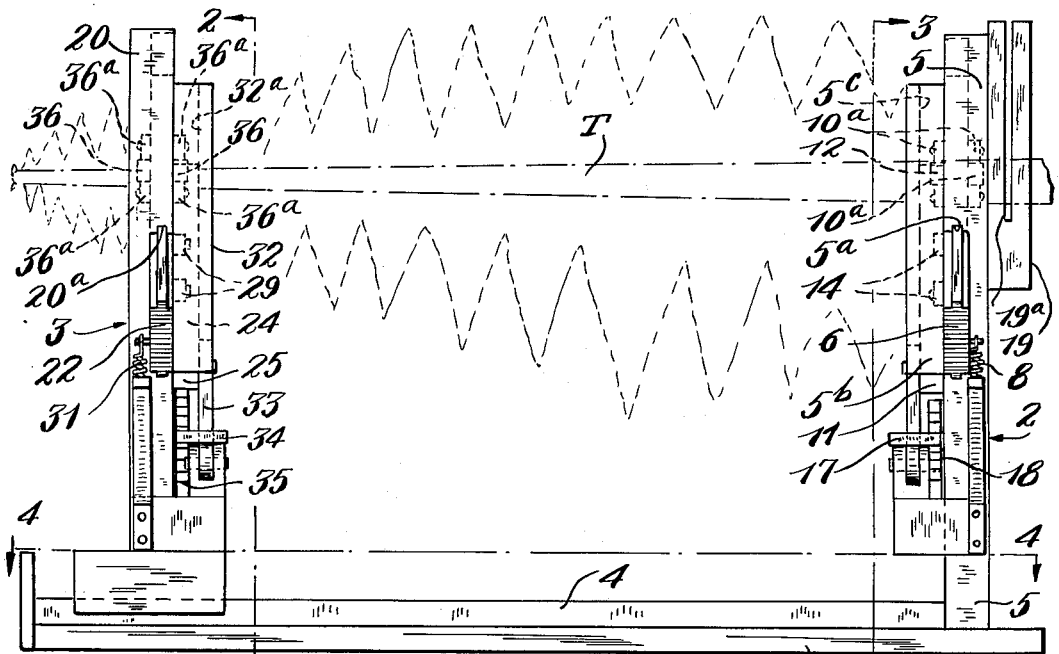
Fig. 1 shows one form of my present invention in elevation.

It is to be understood that the present form of disclosure is merely for the purpose of illustration and that there might be various modifications thereof without departing from the spirit of my invention as herein set forth and claimed.

One form of my present invention is illustrated in Figs. 1 to 5 inclusive while another form of the same invention is indicated in Figs. 6, 7, and 8 of the present drawings. Each of these two forms of invention comprises a base upon which there are mounted a stationary centering and clamping unit and a companion centering and clamping unit that is movable towards and from the first unit. Upon each of these two units there are mounted companion centering and clamping jaws which are adjustable towards and from an imaginary longitudinal axis, the jaws of one unit being adjustable independently of the jaws of the other unit; and associated with the stationary unit there is a means for forming the larger end of a tree or other tapering body with a squared surface, that is normal to the imaginary longitudinal axis of the tree trunk. It might be explained that the plane of adjustment of the clamping jaws is at right angle to the imaginary axis and that the plane occupied by the means for forming the larger end of the tree trunk or other tapering body is likewise at right angle to the imaginary axis which is preliminarily established in the construction of the present assembly. In both of these two forms of device, as above briefly referred to, the separately adjustable clamping means provided upon the two companion units are so formed as to be capable of engaging the tree trunk or other tapering body in such manner and to so position the same as to ensure bringing the longitudinal axis of the tree trunk or other tapering body into coincidence or registry with the imaginary axis that has been preliminarily established in the present device.

The main difference between the two forms of device, as herein referred to and as illustrated in the accompanying drawing, resides in the particular means for forming the desired squared surface upon the larger end of the tree or other tapering body, as will more fully appear from the following.

Upon the base 1 there is fixedly mounted the one positioning and clamping unit 2 while the other positioning and clamping unit 3 is adjustable along the parallel tracks 4 upon the base 1. The two units 2 and 3 occupy planes that are parallel to each other and that are at right angles to the tracks 4. Likewise, in each instance the means for forming the desired squared surface at the larger end of the tree or other tapering body is also operatable in a plane at right angle to the imaginary longitudinal axis that has been preliminary established in the present assembly.

The stationary unit 2, in the form of structure illustrated in Fig. 3 of the present drawings, comprises the upright frame 5 upon which are mounted the reciprocatable duplicate positioning and clamping members 6 and 7. The members 6 and 7 may be reciprocatably or slidably mounted in any suitable manner, as for instance by means of the guide grooves 5a provided in the sides of the inset slide-ways therefor in the frame 5; and the members 6 and 7 are normally withdrawn rearwardly by means of the coil springs 8 and 9. In the form of structure herein indicated, the members 6 and 7 are mounted for movement along a path approximately forty-five (45) degrees to the horizontal although the present invention is not restricted to this particular angle, and the grooved sliding surfaces 5a are inclined upwardly and inwardly towards each other for this purpose. Each of the members 6 and 7 has its inner end surface 6a, 7a inclined slightly inwardly and upwardly, as indicated in Fig. 3 of the present form of illustration, and each of these members is provided with a substantially horizontally extending supporting arm 10 that is adapted to engage and support the under-surface of the tree trunk or other tapering body, each arm 10 extending between guide rollers 10a upon the other one of the members 6 and 7 so as to thereby ensure movement of the members 6 and 7 in unison. The direction of movement of the members 6 and 7 corresponds to a line that bisects the angle that is formed by the intersection of the surface 6a or 7a with the arm 10 in each instance and that is of the same degree in both instances, these two paths intersecting at a point in the imaginary longitudinal axis.

In order to operate members 6 and 7, there is provided a cross-bar 11 with upward projections 12 and 13 adapted to have their inner inclined faces engage the rollers 14 and 15 upon the members 6 and 7 while the vertical rear faces of projections 12 and 13 have slidable engagement with the vertically disposed grooved surfaces 5c of the strips 5b that are secured to the frame 5 and extend across the members 6 and 7. The cross-bar 11 may have connected thereto the pivotal link 16 which in turn is pivotally connected to one end of foot treadle 17 rockably mounted in the frame 5. A ratchet 18 may be provided for holding the foot treadle in the position to which adjusted.

A saw guide 19 may be fixedly mounted upon the outer side of the frame 5 of the stationary unit 2, this guide having an opening to accommodate the tree trunk T or other such body, as indicated in Fig. 3 of the present drawings, and having a saw slot 19a. It should be here explained that the plane of the saw slot 19a is at right angle to the imaginary longitudinal axis that has been preliminarily established in the present assembly.

It is to be understood that the larger end of the tree trunk T, for instance, may first be positioned in the stationary unit 2 so as to have the same positioned properly with respect to the saw guide 19, and that the adjustable unit 3 may then be positioned at the proper point along the tree trunk or other such body. That is to say, in the case of a tree the adjustable unit may be placed at a point between the branches or limbs of the tree so as to thereby ensure an effective and dependable engagement of the tree trunk T within the positioning and clamping unit 3. If so desired, the bole-clamping mechanism may be positioned upon the other side of the frame 20 as a matter of convenience with respect to the limbs or branches of the tree, the present arrangement being only illustrative.

Figure 2:
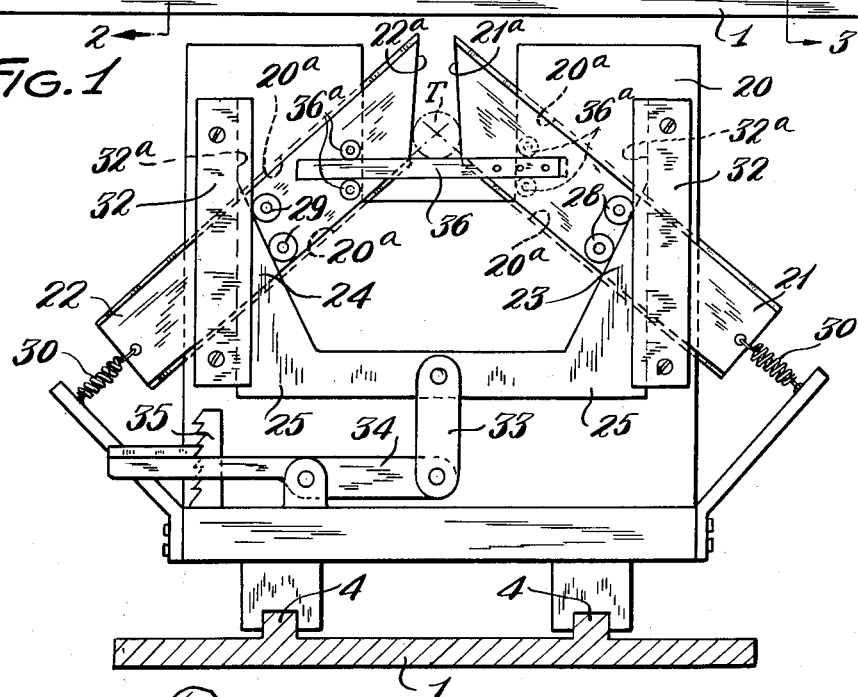
Fig. 2 is a view taken on line 2—2 of Fig. 1.

The movable or adjustable unit 3 has the upright frame 20 which has slidable engagement with the tracks 4 and has the angularly slidable duplicate positioning and clamping members 21 and 22 which are adapted to be maintained in a vertical plane by means of the guide grooves 20a in the sides of the inset slide-ways therefor in the frame 20. The members 21 and 22 are adjustable upwardly and inwardly along their guide-ways at an angle of approximately forty-five (45) degrees, according to the particular form of structure as herein illustrated, although the present invention is not limited to this particular angle. The projections 23 and 24 have inclined inner surfaces for engagement with rollers 28 and 29 on the members 21 and 22 for effecting movement of the same as the projections 23 and 24 are moved upwardly, the members 21 and 22 being normally forced rearwardly by the coil springs 30 and 31 which are anchored to projections upon the frame 20. The cross-arm 25 is ensured straight-line movement by engagement of the vertical edges of the projections 23 and 24 with slide grooves 32a in the inner edges of the upright strips 32 which are attached to the frame 20 and extend across the members 21 and 22. The cross-arm 25 may be adjusted upwardly by means of the pivotal link 33 which has pivotal connection with the inner end of the foot treadle 34 rockably mounted in the frame 20; and a ratchet 35 on the frame 20 will serve to maintain the treadle in adjusted position, as may be desired. The inner faces 21a and 22a of the upper ends of the members 21 and 22 are inclined upwardly and inwardly, as indicated in Fig. 2 of the drawings, and these members each have a transversely or horizontally disposed projection 36 extending inwardly in such manner as to be adapted to engage the under-surface of the tree trunk T or other tapering body; and there may be provided rollers 36a upon each of the members 21 and 22 so as to accommodate the horizontal projection 36 upon the other such member and so as to thereby ensure movement of the members 21 and 22 in unison.

It may be here explained, as also in the case of the other unit which is stationary, the path of adjustment of the members 21 and 22 is in a direction corresponding to a line bisecting the angle which is formed between the horizontal projections 36 and the surfaces 21a and 22a and which is of the same degree in both instances, and the intersection of such lines of adjustment will be in the imaginary axis which has been established preliminarily in the present assembly, as above explained.

As above indicated, the frames 5 and 20 are so mounted upon the base 1 and the members 6, 7 and 21, 22 are so mounted upon the frames 5 and 20, respectively, and are capable of adjustable movement in such manner and also the upper or inner ends of the members 6, 7 and 21, 22 are so formed and arranged that the intersection of the projected surfaces 6 and 7 will be in the same imaginary longitudinal axis; so that upon positioning and clamping a tapering cylindrical body between members 6, 7 and 21, 22 in the manner above explained, the longitudinal axis of such body will be made to correspond with the preliminarily established imaginary longitudinal axis. Then, with the tapering body in such clamped position and with the plane of the saw slot 19a at right angle to the imaginary longitudinal axis, there will be ensured a cutting of a squared surface upon the larger end of the tree trunk, that is at right angle to the longitudinal axis of the same.

Figure 5:
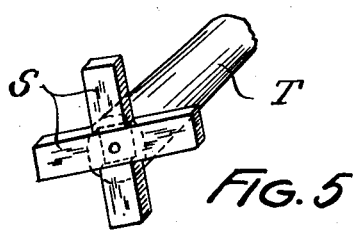
Fig. 5 is a perspective view illustrating one simple form of means for supporting the tree after having its lower end formed with a square surface, that is at right angle to the longitudinal axis of the tree trunk.

Then, with the bottom or larger end of the tree trunk T so formed, it becomes a comparatively simple matter to provide means for supporting the tree in upright and erect position. For instance, this may be accomplished by merely applying across the squared end of the tree trunk two flat cross strips S which may be made flush with each other so as to provide a flat surface for resting upon the floor. A single nail may be sufficient for applying these strips to the bottom of the tree trunk T. This form of support is illustrated in Fig. 5 of the present drawings.

I will now describe a modification of my present invention as illustrated in Figs. 6, 7 and 8 of the accompanying drawings. As above indicated, in this second form of device there is employed the same form of means for positioning and clamping the tree trunk T or other tapering body preparatory to squaring the larger end of the same; and this modification differs from the first form of my present invention only with respect to the particular form of means for forming the lower or larger end of the tree trunk or other tapering body.

In this second form of device there is mounted upon an extended base 1 a rotary plane 40 with the cutting edges 40a provided upon the forward surface thereof and with a drill 41 extending forwardly and co-axially therefrom. The rotary plane 40 has a sleeve 42 extending rearwardly from the centre thereof and this sleeve has spline connection with the rotary shaft 43 of an electric motor 44. A suitable lever manipulating means 45, which is mounted upon the base 1, has an arm 46 with a pin 47 in operative engagement within the yoke 48 provided upon the sleeve 42, whereby the rotary plane 40 and its drill 41 may be moved into and out of engagement with the butt end of the tree trunk T by manipulation of the lever 45, as may be readily understood. Thus at the same time as the end of the tree trunk is being squared at right angle to the longitudinal axis thereof, there is being formed in the end of the tree trunk T a bore along the longitudinal axis thereof for the purpose of receiving a corresponding upright projection of a supporting means to be applied thereto.

This particular form of supporting means comprises a base 50 with a flat upper surface having an upwardly extending pin 51 located centrally thereof and at right angle thereto. The pin 51 will be inserted within the bore that has been formed in the butt end of the tree trunk T and will have such snug fit therein as to ensure firm supporting engagement of the tree trunk upon the base 50. The base 50 will be of sufficient diameter for dependable support so as to prevent toppling of the tree.

If so desired, the base 50 may serve as the bottom of a container with a side wall 52 surrounding and spaced from the tree trunk T; and the bottom of such container may be formed with a grid or other suitable form of grooves 53 which are inter-communicating and which extend below the bottom of the tree trunk and therebeyond. The purpose of this container is to hold a supply of water which may find its way through the grooves 53 to the squared end of the tree trunk which will thus receive the necessary moisture to prevent the tree from drying unduly and thus keep the fire hazard down to a minimum. Also, the surface of the pin 51 may be provided with a spiral groove 51a in communication at its lower end with the grooves 53 so as to permit the water to feed up through the spiral groove 51a, thereby increasing the effectiveness of this particular feature.

Also, the base 50 may have an off-centre upwardly projecting spur 50a that will engage in the end of the tree trunk so as to prevent turning of the tree about the pin 51.

It is believed that the practical advantages flowing from my present invention will be apparent to those who are familiar with the art to which it relates.

What I claim is:

1. In a device of the class described, the combination of a longitudinal support, a pair of companion bole-centering means mounted upon said support and extending in planes at ninety degrees to an imaginary longitudinal axis along said support at spaced points therealong and being relatively adjustable in a direction towards and from each other, at least one of said companion bole-centering means having duplicate angularly disposed bole-engaging surfaces adjustable rectilinearly in a direction towards and from and in a plane at ninety degrees to the imaginary longitudinal axis so as to cause the longitudinal axis of a bole to register with the imaginary longitudinal axis, means for simultaneously moving said adjustable angularly disposed bole-engaging surfaces rectilinearly towards and away from each other, and means operable in a plane normal to the imaginary longitudinal axis for forming one end of the bole with a surface at right angle to the longitudinal axis thereof.

2. The same structure as recited in claim 1 hereof and in which the angularity between said bole-engaging surfaces, is less than ninety degrees.

3. The same structure as recited in claim 1 hereof and in which one of said bole-centering means is immovable upon said support and the other of said bole-centering means is adjustable along a straight line towards and from said immovable bole-centering means and in which said forming means is mounted in fixed relation to said immovable bole-centering means.

4. In a device of the class described, the combination of a longitudinal support, a pair of companion bole-centering means mounted upon said support and extending in planes at ninety degrees to an imaginary longitudinal axis along said support at spaced points therealong and being relatively adjustable in a direction towards and from each other, each of said companion bole-centering means having duplicate angularly disposed bole-engaging surfaces adjustable rectilinearly in a direction towards and from and in a plane at ninety degrees to the imaginary longitudinal axis so as to cause the longitudinal axis of a bole to register with the imaginary longitudinal axis, means for simultaneously moving said adjustable angularly disposed bole-engaging surfaces rectilinearly towards and away from each other, and means operable in a plane normal to the imaginary longitudinal axis for forming one end of the bole with a surface at right angle to the longitudinal axis thereof.

References Cited in the file of this patent

UNITED STATES PATENTS

| Number | Name | Date |
|---|---|---|
| 194,657 | Date | Aug. 28, 1877 |
| 259,928 | Scherer | June 20, 1882 |
| 410,414 | Hall | Sept. 3, 1889 |
| 1,161,983 | Schultz | Nov. 30, 1915 |
| 1,287,528 | Webster | Dec. 10, 1918 |
| 1,313,064 | Butler | Aug. 12, 1919 |
| 1,363,478 | Lyon | Dec. 28, 1920 |
| 1,616,909 | Lorenz et al. | Feb. 8, 1927 |
| 1,644,530 | Johnson | Oct. 4, 1927 |
| 1,661,789 | Coibion | Mar. 6, 1928 |
| 1,914,150 | Muldoon | June 13, 1933 |
| 2,352,885 | Bukowski | July 4, 1944 |
| 2,534,349 | Groat | Dec. 19, 1950 |